(12) United States Patent
Ueda et al.

(10) Patent No.: US 8,088,331 B2
(45) Date of Patent: Jan. 3, 2012

(54) ACID LIQUID LEAKAGE SENSOR

(75) Inventors: Takeharu Ueda, Tokyo (JP); Kunihisa Satoh, Tokyo (JP); Keiichi Sato, Tokyo (JP); Ichiro Kiyokawa, Tokyo (JP); Tomonobu Tsujikawa, Tokyo (JP); Toshio Matsushima, Tokyo (JP)

(73) Assignees: Origin Electric Company, Limited, Tokyo (JP); NTT Facilities, Inc., Tokyo (JP)

( * ) Notice: Subject to any disclaimer, the term of this patent is extended or adjusted under 35 U.S.C. 154(b) by 1233 days.

(21) Appl. No.: 10/585,513

(22) PCT Filed: Feb. 26, 2004

(86) PCT No.: PCT/JP2004/002316
§ 371 (c)(1),
(2), (4) Date: Apr. 3, 2007

(87) PCT Pub. No.: WO2005/083410
PCT Pub. Date: Sep. 9, 2005

(65) Prior Publication Data
US 2007/0275296 A1 Nov. 29, 2007

(51) Int. Cl.
*G01N 15/06* (2006.01)
*G01N 33/00* (2006.01)
*G01N 33/48* (2006.01)

(52) U.S. Cl. .... 422/68.1; 422/50; 422/82.01; 422/82.02

(58) Field of Classification Search .................. 422/50, 422/68.1, 82.01, 82.02
See application file for complete search history.

(56) References Cited

U.S. PATENT DOCUMENTS

| 4,649,364 A | 3/1987 | Tanahashi et al. |
| 4,918,977 A * | 4/1990 | Takahashi et al. .......... 73/40.5 R |
| 5,331,287 A | 7/1994 | Yamagishi et al. |
| 5,381,097 A * | 1/1995 | Takatori et al. ............... 324/512 |
| 6,484,564 B1 * | 11/2002 | Hayashida ........................ 73/40 |

FOREIGN PATENT DOCUMENTS

| JP | 6-300724 | 10/1994 |
| JP | 2001-296201 | 10/2001 |
| JP | 2002-277435 | 9/2002 |
| JP | 2003-243047 A | 8/2003 |
| JP | 2004-93246 | 3/2004 |

* cited by examiner

*Primary Examiner* — Brian J Sines
(74) *Attorney, Agent, or Firm* — Leydig, Voit & Mayer, Ltd.

(57) ABSTRACT

An acid liquid leakage sensor quickly detecting liquid leakage from a device, such as a battery or the like, containing an acid liquid includes a first conductive member, a second conductive member, and an electrically insulating material which establishes an electrically insulating state between these first and second conductive members. The electrically insulating material includes a macromolecular compound having a basic functional group, and an electrical insulation characteristic or high resistance characteristic that decreases upon reaction with an acid liquid. It is possible to detect leakage of acid liquid, such as battery fluid, by detecting the change of conductive state between the first conductive member and the second conductive member which accompanies a decrease of the electrical insulation characteristic or high resistance characteristic of the electrically insulating material, when acid liquid leaks out and drips down the electrically insulating material.

11 Claims, 6 Drawing Sheets

US 8,088,331 B2

ACID LIQUID LEAKAGE SENSOR

TECHNICAL FIELD

The present invention relates to an acid liquid leakage sensor which detects leakage of an acid liquid such as battery fluid or the like.

BACKGROUND ART

From the past, batteries such as lead-acid batteries and the like have been used as power supplies for various types of device. Dilute sulfuric acid is filled into these batteries as battery fluid.

FIG. 11 is a figure showing an example of an uninterruptible power supply which employs a battery. The schematic structure of this uninterruptible power supply is that it comprises a rectification circuit 2 which is connected to the commercial AC power supply 1, a switching circuit 3 which is connected to the output side of the rectification circuit 2, and a plurality of batteries 10 in series, likewise connected to the output side of the rectification circuit 2. The switching circuit 3 is a device which converts the output voltage of the rectification circuit 2 or the voltage of the batteries 10 by switching to AC voltage which it outputs, and this output is supplied as driving electrical power to a load 4.

When the commercial AC power 1 supply is available as normal, along with the output voltage of the rectification circuit 2 being inputted to the switching circuit 3, the batteries 10 are also charged up by this output voltage of the rectification circuit 2. However, when an interruption occurs in the supply of power from the commercial AC power supply, the batteries 10 discharge, and their discharge voltage is inputted to the switching circuit 3. Due to this discharge, the supply of power to the load 4 is maintained.

The batteries 10 are housed in a case 11, so that even if, hypothetically, one of the batteries 10 should suffer liquid leakage, then the battery fluid 12 which has thus leaked out does not flow out from the case.

However, if the case 11 is made from metal, then the pole plates within the battery 10 and the case 11 are electrically connected together via the battery fluid 12 which has thus leaked out, and, as shown by the broken lines with arrows in the figure, a short circuit is created via the commercial AC power supply 1, the rectification circuit 2, the battery 10, and the case 11. When this short circuit is created, a large current flows through the portion which has become electrically conducting due to the battery fluid 12, and sparking may occur, which is undesirable.

If the case 11 is made from resin, then it is at least possible to avoid electrical conduction between the pole plates in the battery 10 and the case 11 taking place via the battery fluid. However, even if the case 11 is made from a resin, nevertheless, if liquid leakage has occurred from a plurality of the batteries 10, then a short circuit between these batteries 10 is undesirably set up via the battery fluid 12 which has leaked out, and a large current flows in the portion which has become electrically conducting due to the battery fluid 12, and, again, undesirable sparking may occur.

As a technique for detecting leakage of battery fluid, there has already been proposed, in Japanese Patent Laid-Open Publication 2003-243047, a battery fluid liquid leakage sensor which comprises, in superimposed layers, a first insulating member which is pervious to battery fluid, a first electrically conductive member which is pervious to battery fluid, a second insulating member which is pervious to battery fluid, a second electrically conductive member, and a third insulating member which is impervious to battery fluid.

SUMMARY OF THE INVENTION

The object of the present invention is to provide an acid liquid leakage sensor, which can quickly detect liquid leakage from a device such as a battery in which an acid liquid is charged.

The acid liquid leakage sensor of the present invention comprises a first conductive member, a second conductive member, and an electrically insulating material which establishes an electrically insulating state between the first conductive member and the second conductive member; and the electrically insulating material includes a macromolecular compound having a basic functional group, and is one whose electrical insulation characteristic (high resistance characteristic) decreases upon reaction with an acid liquid.

When acid liquid such as battery fluid leaks, by the basic functional group experiencing neutralization action due to the acid liquid, the resistance of the electrically insulating material to the acid liquid becomes weak, and, along therewith, the electrical insulation characteristic (the high resistance characteristic) of the electrical insulation material decreases. The acid liquid leakage sensor of the present invention can simply detect leakage of the acid liquid, by detecting change of phenomena due to decrease of the electrical insulation characteristic (the high resistance characteristic) between the first conductive member and the second conductive member.

Furthermore, since the macromolecular compound which has the basic functional group has a glass transition temperature of 40° C. or higher, even if the temperature of the location in which the storage battery or the like is kept increases, the electrically insulating material does not soften, and accordingly the acid liquid leakage sensor of the present invention operates even in conditions of high temperature.

Furthermore, since the macromolecular compound having a basic functional group is obtained by radical polymerization, accordingly not only does it dissolve easily in the acid liquid, but it can easily stick to the conductive members, and it also becomes simple to adjust the hardness of a coating layer.

Furthermore, when the electrically insulating material includes an extender, then it can more easily get into a state of being soluble in water, and its resistance to acid liquid or the like becomes weak, so that it is possible to detect leakage of acid liquid quickly.

And, if the extender includes a metallic carbonate, then the electrically insulating material, when it includes the extender, can yet more easily get into a state of being soluble in water, and its resistance to acid liquid or the like becomes weak, so that it is possible to detect leakage of acid liquid quickly.

Furthermore, when the second conductive member is made from a substance which offers an ionization tendency which is of a value different from the ionization tendency possessed by the substance from which the first conductive member is made, then, when the electrical insulation characteristic of the electrically insulating material decreases or it dissolves, since an electromotive force is generated between the first conductive member and the second conductive member, accordingly it is possible to detect the leakage of acid liquid by detecting this electromotive force, without the provision of any power supply.

Furthermore, it is desirable for the first conductive member to be a first comb shaped electrode which includes a common electrode member and a plurality of fine electrode members which extend from this electrode member, and for the second conductive member to be a second comb shaped electrode which includes a common electrode member and a plurality of fine electrode members which extend from this electrode member between the fine electrodes of the first comb shaped electrode. This concept is suitable for application, if the detection area for acid liquid leakage is large.

Furthermore, it is desirable for the gap between the first comb shaped electrode and the second comb shaped electrode to be greater than or equal to 0.5 mm and less than or equal to 8 mm; and, in this case, even if a small amount of acid liquid leaks out, it is possible to detect it reliably, so that it is possible to enhance the reliability of the sensor.

Furthermore, it is desirable for the first and second comb shaped conductive members to be made from a printing material in which a metallic material selected from zinc, copper, iron, aluminum, tin, nickel, and magnesium, or a powder of this metallic material, is mixed with a resin which becomes a binder.

Furthermore, it is desirable further to include a notification means which operates by change of the electrical conduction state, or by electromotive force, between the first conductive member and the second conductive member, since thereby it is simple to notify the results of detection.

PREFERRED EMBODIMENTS FOR IMPLEMENTING THE INVENTION

In the following, the present invention will be explained in detail with reference to the drawings.

First Embodiment

Figure 1:
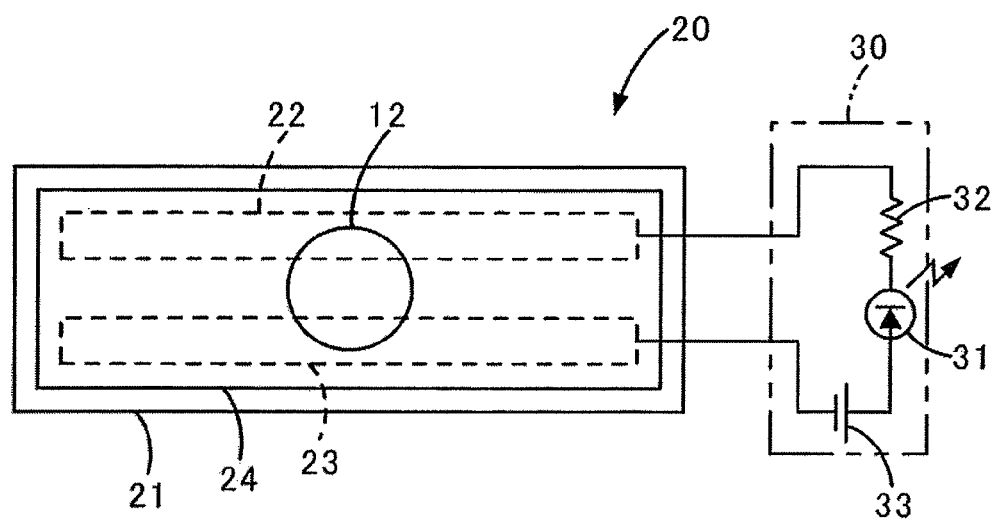
FIG. 1 is a plan view showing the upper surface of an example of the acid liquid leakage sensor of the present invention.

FIG. 1 is a plan view showing the upper surface of an example of a battery liquid leakage sensor, which is an acid liquid leakage sensor according to the present invention. This battery liquid leakage sensor 20 has a schematic structure which comprises: a base member 21 of sheet form; a first electrically conductive member 22 and a second electrically conductive member 23, both of band form, and arranged in parallel with a gap between them; a covering layer 24 which covers the surface of the base member 21 over each of the first conductive member 22 and the second conductive member 23, and which ensures that the first conductive member 22 and the second conductive member 23 are electrically insulated from one another or are separated by a high resistance; and a notification device 30 (a notification means) which is connected by lead wires to the first conductive member 22 and the second conductive member 23.

The notification device 30 has a schematic structure which comprises a light emitting diode 31, a protective resistor 32, and a battery 33. The voltage of the battery 33 is always applied to the first conductive member 22 and the second conductive member 23, via the light emitting diode 31 and the protective resistor 32.

It should be understood that, although the battery 33 has been explained as being a DC power supply, it may also be the commercial AC power supply.

The base member 21 is made in sheet form from a material which is impervious to battery fluid and moreover is flame-retardant; for example, flame-retardant polyester or flame-retardant polyimide may be utilized as this material.

The first conductive member 22 and the second conductive member 23 are band shaped members which are made from an electrically conductive material chosen from metals such as copper, aluminum, iron, or the like.

The covering layer 24 is made from an electrically insulating material whose electrical insulation characteristic decreases upon reaction with the battery fluid 12 (acid liquid), and it is a coating layer which is formed by coating an electrically insulating coating material made from this electrically insulating material upon the surfaces of the base member 21, the first conductive member 22, and the second conductive member 23, and by drying it; or, alternatively, it may be formed by adhering a covering sheet formed from the electrically insulating material upon the surfaces of the base member 21, the first conductive member 22, and the second conductive member 23.

In normal conditions, this covering layer 24 serves to cover over and to protect the first conductive member 22 and the second conductive member 23; while, if battery fluid 12 has leaked from the battery, it reacts with this battery fluid 12 and puts the first conductive member 22 and the second conductive member 23 into an electrically conducting state, via the covering layer 24 whose electrical insulating characteristic or high resistance characteristic has been decreased due to the battery fluid 12.

Here, in the reaction between the battery fluid and the electrically insulating material, there is a neutralization reaction or a decomposition reaction or the like. In order reliably to establish electrical conduction between the first conductive member 22 and the second conductive member 23, it is desirable for the electrically insulating material to be one which dissolves upon reaction with the battery fluid.

As the electrically insulating material which reacts with the battery fluid and dissolves, a material which includes a macromolecular compound having a basic functional group is appropriate. This is because, due to the fact that the basic functional group experiences neutralization action due to an acid liquid such as battery fluid or the like, the electrically insulating material can easily attain a state in which it is soluble in water, so that its resistance with respect to acid liquid or the like becomes extremely weak.

A basic functional group represented by an amino group is desirably used as the basic functional group. Furthermore, a general type of macromolecular compound such as polyester resin, acrylic resin, urethane resin or the like may be cited as the macromolecular compound. In particular if, in addition to consideration being paid to the solubility of the coating layer (the covering layer 24) in acid liquid (battery fluid), consideration is also paid to its adhesion characteristics with respect to the backing, and to the question of making it easy to adjust the hardness of the coating layer and so on, then it is desirable to utilize a macromolecular compound which is obtained by radical polymerization of a monomer compound which has a basic functional group, and, according to requirements, a monomer component which is capable of copolymerization therewith. Furthermore the fact that, in radical polymerization, the polymerization reaction does not experience any great influence upon adjustment of the degree of alkalinity or the like, is also one reason why a macromolecular compound which is obtained by radical polymerization is appropriate for the macromolecular compound which includes a basic functional group.

As the monomer compound which has a basic functional group, it is possible to suggest, by way of example, acrylamide, N-methylol acrylamide, N-methylol methacrylamide, N-methylol butyl ether acrylamide, N,N-dimethyl amino propyl acrylamide, dimethyl amino ethyl methacrylate, dimethyl amino ethyl acrylate, diethyl amino ethyl methacrylate, diethyl amino ethyl acrylate, or the like.

As the monomer compound which is capable of copolymerization, it is possible to suggest, by way of example, an acrylic ester or a methacrylic ester, such as, for example: an alkyl ester with 1 to 18 carbons which is an acrylate or a methacrylate, such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate, lauryl methacrylate, or the like; an alkoxy alkyl ester with 2 to 18 carbons which is an acrylate or methacrylate, like methoxy butyl acrylate, methoxy butyl methacrylate, methoxy ethyl acrylate, methoxy ethyl methacrylate, butyl ethoxy acrylate, butyl ethoxy methacrylate, or the like; an alkanyl ester with 2 to 8 carbons which is an acrylate or methacrylate, like allyl acrylate or allyl methacrylate or the like; a hydroxyl alkyl ester with 2 to 8 carbons which is an acrylate or methacrylate, like hydroxy ethyl acrylate, hydroxy ethyl methacrylate, hydroxy butyl acrylate, hydroxy butyl methacrylate, hydroxy propyl acrylate, hydroxy propyl methacrylate or the like; an alkanyl oxy alkyl ester with 3 to 18 carbons which is an acrylate or a methacrylate, such as allyl oxy ethyl acrylate or allyl oxy ethyl methacrylate or the like; an aromatic vinyl compound such as styrene, α-methyl styrene, vinyl toluene, p-chloro styrene or the like; a polyolefin type compound such as butadiene, isoprene, chloroprene, or the like; or, otherwise, a caprolactone denatured acrylate ester compound, a caprolactone denatured ester methacrylate, acrylonitrile, methacrylonitrile, methyl iso propenyl ketone, vinyl acetate, vinyl propionate, vinyl piverate, acrylate, methacrylate, itaconate, crotonate, allyl alcohol, maleate, or the like.

It is desirable for the monomer component having a basic functional group to be 10% by weight or more of the entire amount of radical polymerized monomer which is included in the macromolecular compound; and it should more desirably be 20% by weight to 80% by weight thereof, and even more desirably 40% by weight to 70% by weight thereof. If the monomer component which has a basic functional group is less than 10% by weight (although there is some variation according to its degree of alkalinity), then there is a danger that the coating layer (the covering layer 24) may only dissolve in acid liquid (battery fluid) with difficulty, or may not dissolve therein at all. Furthermore, it is not desirable to make the macromolecular compound only from the monomer component which has a basic functional group, in order for its various properties to be adjusted, such as the adhesion characteristic of the coating layer to the backing and hardness of the coating layer and the like.

As the macromolecular compound which includes a basic functional group, although one may be used which also serves for a cross-linking reaction, when the question of solubility in the battery fluid is considered, it is desirable for its liquid composition to be of a lacquer type. In this case, it is desirable for the glass transition temperature (Tg) of the macromolecular compound having a basic functional group to be set higher than normal temperature. The reason for this is that the inconvenience might occur of the covering layer 24, which is made from electrically insulating material, softening and getting sticky under high temperatures such as during summer, or the like.

The glass transition temperature Tg is not a value which can be determined accurately, because it fluctuates according to the molecular weight of the macromolecular compound and its conditions of synthesis, but, according to the present invention, it is presumed to be calculated according to the following Equation (1):

$$Tg = W1 \times Tg1 + W2 \times Tg2 \ldots + Wn Tgn \tag{1}$$

The published values of the glass transition temperatures of the mono polymers which are employed for the copolymerized material made from n kinds of monomer are taken as being Tg1, Tg2, ... Tgn, and the weight proportions of these monomers in the copolymerized material are taken as being W1, W2, ... Wn respectively.

The glass transition temperature Tg of the macromolecular compound having a basic functional group which is obtained using this equation desirably is greater than or equal to 40° C., and more desirably is greater than or equal to 60° C.

Furthermore, it is more desirable to utilize a macromolecular compound which is obtained by radical polymerization within an organic solvent as the macromolecular compound having a basic functional group. The use of a macromolecular compound having a basic functional group which is obtained by some process other than radical polymerization within an organic solvent, for example one which is in the state of an aqueous emulsion, is not desirable, because the solubility of the coating layer (the covering layer 24) which is formed in acid liquid (battery fluid) is low, and in some cases it may not dissolve at all.

This type of macromolecular compound may be obtained by the same method and under the same conditions as one obtained by radical polymerization of a normal acrylic resin or vinyl resin or the like. In concrete terms a method may be cited, by way of example, in which each of the monomer compounds is dissolved in an organic solvent, and they are heated at a temperature of 60° C. to 180° C. in an ambient atmosphere of nitrogen, while being mixed together in the presence of a radical polymerization initiator. The reaction time may be normally set to approximately one to ten hours.

As the organic solvent, an ether type solvent, an alcohol type solvent, an ester type solvent, or a hydrocarbon type solvent may be employed.

As the radical polymerization initiator, one which is normally used may be employed; as examples thereof, benzoyl peroxide, a peroxide such as t-butyl peroxy-2-ethyl hexanoate or the like, or an azo compound like azobis isobutyro nitrile, azobis dimethyl valero nitrile, or the like may be cited.

It is desirable for the electrically insulating material which forms the covering layer 24 to include one or more types of extender. The reason for this is that the resistance of the coating layer (the covering layer 24) with respect to acid liquid (battery fluid) is reduced by the use of an extender, and this is advantageous for the action of dissolving the covering layer 24. As this extender, by way of example, crystalline silica, fused silica, talc, clay, barium sulfate, calcium carbonate, mica, an aluminum compound, a magnesium compound, bentonite, diatomite, a zinc compound, a barium compound, or the like may be cited. In particular, it is desirable to utilize calcium carbonate, a metallic carbonate such as magnesium carbonate, or particles of silica or acrylic resin or the like, and it is more desirable to utilize calcium carbonate, since, during the reaction with the battery fluid, the contact area between the battery fluid and the covering layer is increased by the formation of an immense number of minute holes in the covering layer 24, and, at the same time as promoting the dissolving of the covering layer 24, this also generates gas bubbles (carbon dioxide bubbles), and thereby operates so as to strip off the covering layer 24 from the first conductive member 22 and the second conductive member 23.

It is possible to utilize extenders of one or more of these types together. The proportion of extender within the composition of the coating material differs according to the shapes and sizes of the particles thereof, but it is desirable to include 10% by weight or more of the coating material solid contents. More desirably, this is 30% by weight or more. The reason for this is that, if 10% or less of extender is employed, then the action described above for dissolving of the covering layer 24 by reduction of its resistance to acid liquid is too low. From the point of view of enhancing the external appearance of this acid liquid leakage sensor or its resistance or the like, the amount of this extender which is included should be less than or equal to 65% by weight, and desirably should be less than or equal to 50% by weight. Furthermore, it is desirable for the diameter of the particles of the extender to be as minute as possible. In concrete terms, it is desirable for its average particle diameter to be in the region of from 0.1 to 10 micrometers.

Furthermore, it is desirable to endow the covering layer 24 with a flame retardant characteristic by adding, to the electrically insulating material, an inorganic type flame retardant material such as aluminum hydroxide, antimony trioxide, magnesium hydroxide, or the like, or by adding an organic type flame retardant material such as a halogen compound or a phosphate compound or the like.

Moreover, according to requirements, it is possible to add, to the electrically insulating material, a per se known surface treatment material, a fluidity conditioning material, an ultraviolet ray absorbent material, a photo-stabilization material, a hardening catalyst, a coloring pigment, a powdered mica pigment, a dye, an organic solvent, or the like. However, if ABS resin is used for the vessel containing the battery, it is desirable for the electrically insulating material not to include a plasticizer, a rust preventative, an interface activator, any type of grease or oil (such as mineral oil, silicon oil, or the like), a leveling material, a pigment dispersal material, an antifoaming agent, a reaction catalyst, a dye in liquid form, an ultraviolet ray absorbent material in liquid form, a photo-stabilization material in liquid form, or an organic solvent whose boiling point is 120° C. or greater, since such a substance might attack the ABS resin, which is undesirable.

The electrically insulating coating material may be made by dilution with one or more solvents such as: a hydrocarbon type solvent such as xylene, toluene or the like; a ketone type solvent such as methyl ethyl ketone, methyl isobutyl ketone or the like; an ester type solvent such as ethyl acetate, butyl acetate or the like; an ether type solvent such as dioxane, ethylene glycol diethyl ether or the like; and by then coating it upon the surfaces of the base member 21, the first conductive member 22, and the second conductive member 23 by a coating method such as spray coating, roller coating, brush coating or the like. It should be understood that, if ABS resin is used for the vessel housing the battery, it is desirable for the electrically insulating coating material not to include any organic solvent whose boiling point is greater than or equal to 120° C., since it might attack the ABS resin, which would be undesirable.

Next, the operation of this battery liquid leakage sensor 20 shown in FIG. 1 will be explained.

When liquid leakage from the upper surface of the battery or a crack or the like occurs, the battery fluid 12 which has leaked out drips down to this battery liquid leakage sensor 20, which is disposed on the internal bottom surface of a case in which the battery is housed, or upon the outer side surface of the battery.

The battery fluid 12 which has dripped down reacts with the covering layer 24 of the battery liquid leakage sensor 20 and dissolves it, and arrives at the surfaces of the first conductive member 22 and the second conductive member 23. At this time, the first conductive member 22 and the second conductive member 23 are electrically connected together via the liquid mass which has been produced by the dissolving of the covering layer 24 including the battery fluid 12.

Due to the reduction of the electrically insulating characteristic or the high resistance characteristic of the covering layer 24, an electrical current flows from the battery 33 through the light emitting diode 31 of the notification device 30, and the light emitting diode 31 emits light. And, due to this emission of light, the occurrence of liquid leakage from the battery is notified to maintenance personnel.

Since, in the battery liquid leakage sensor 20 of the above type, the first conductive member 22 and the second conductive member 23 are covered over by the covering layer 24 which is made from an electrically insulating material whose electrical insulation characteristic decreases on reaction with battery fluid, accordingly, in the normal state, the first conductive member 22 and the second conductive member 23 are protected by this covering layer 24; while, if battery fluid has leaked from the battery, due to the covering layer 24 reacting with the battery fluid 12, the first conductive member 22 and the second conductive member 23 are electrically connected together via the battery fluid 12. Thereby, liquid leakage from the battery can be quickly detected.

Second Embodiment

Figure 2:
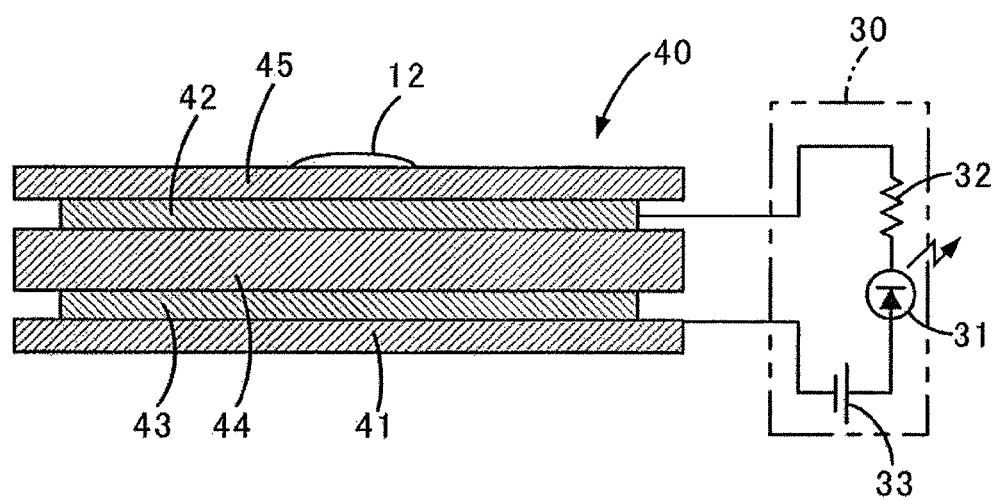
FIG. 2 is a sectional side view showing another example of the acid liquid leakage sensor of the present invention.

FIG. 2 is a sectional side view showing another fundamental example of a battery liquid leakage sensor, which is an acid liquid leakage sensor according to the present invention. This battery liquid leakage sensor 40 has a schematic structure comprising: a base member 41 of sheet form; a first conductive layer member 42 which is permeable to battery fluid (acid liquid); a second conductive layer member 43, an adhesive layer 44 which is interposed between the first conductive layer member 42 and the second conductive layer member 43, and which adheres between these members in an electrically insulating state or a high resistance state; a covering layer 45 which covers over the surface of the first conductive layer member 42; and a notification device 30 (a notification means) which is connected to the first conductive layer member 42 and the second conductive layer member 43. In other words, one distinguishing feature of this second embodiment is that the adhesive layer 44 is utilized as electrically insulating material.

The first conductive layer member 42 and the second conductive layer member 43 may be made from a material which is conductive, such as a metal like copper, aluminum, iron, or the like.

Figure 3:
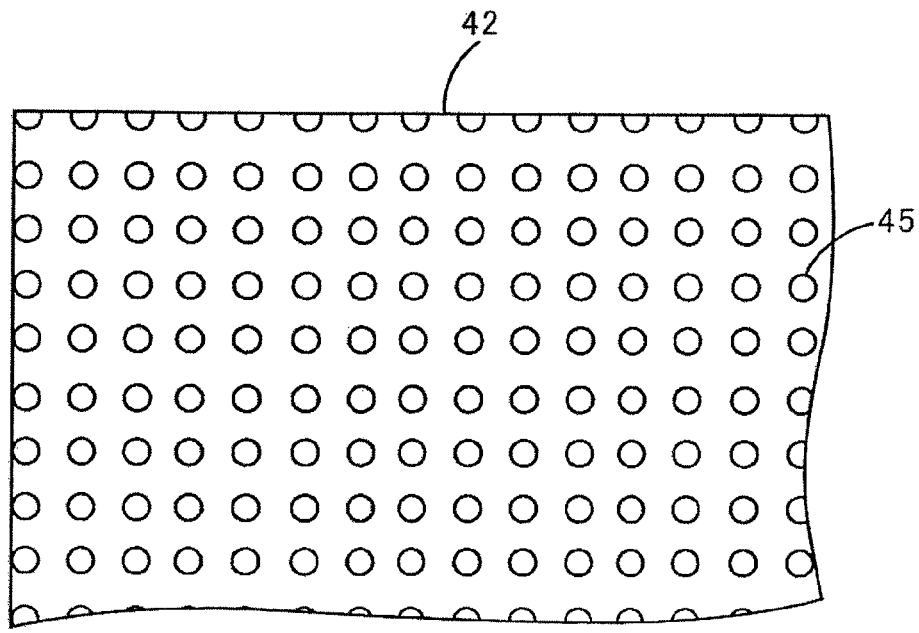
FIG. 3 is a plan view showing the upper surface of an example of a sheet form conductive member which is used in the present invention.
Figure 4:
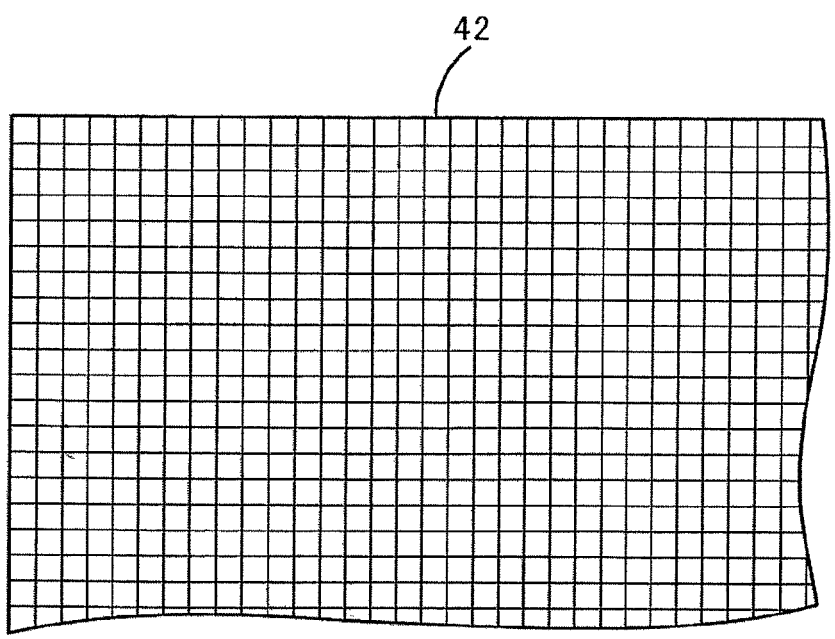
FIG. 4 is a plan view showing the upper surface of another example of a sheet form conductive member which is used in the present invention.

As the conductive sheet member from which the first layer member 42 is formed, in order for it to be permeable to the battery fluid, a sheet may be used in which a large number of punched holes 45 as shown in FIG. 3 are formed, or one formed as a mesh may be used, as shown in FIG. 4.

The adhesive layer 44 is made as an adhesive sheet which is formed from an electrically insulating adhesive or an electrically insulating material, and is made from an electrically insulating substance whose electrical insulation characteristic or high electrical resistance decreases upon reaction with battery fluid (acid liquid).

This adhesive layer 44 adheres together the first conductive layer member 42 and the second conductive layer member 43, and, if battery fluid 12 should leak from the battery, it reacts with this battery fluid 12 and enhances the conductive state between the first conductive layer member 42 and the second conductive layer member 43.

For this adhesive layer 44, just as with the electrically insulating material of the first embodiment, it is desirable to utilize a material which dissolves upon reaction with battery fluid, and it is appropriate for it to include a macromolecular compound which has a basic functional group. If, in addition to solubility in acid liquid (battery fluid), consideration is given to the strength of adhesion of the adhesive layer 44 to the conductive layer members, then it is desirable to utilize a macromolecular compound which is obtained by radical polymerization of a monomer component having a basic functional group, and, according to requirements, a monomer component which is capable of copolymerization therewith. The same substances as described above may be used as the monomer component having a basic functional group, and as the monomer component capable of copolymerization therewith. The other characteristics of the adhesive layer 44 are the same as those of the electrically insulating material which was explained in the description of the first embodiment.

Just as with the electrically insulating material of the first embodiment, it is desirable for the adhesive layer 44 to include extender of one or more types. The reason is that the resistance of the adhesive layer 44 with respect to acid liquid (battery fluid) is decreased by the use of an extender, and this acts advantageously to promote the dissolving of the adhesive layer 44. The same extenders as described above may be used.

The adhesive layer 44 may be made by a method of making an electrically insulating adhesive by diluting an electrically insulating material with a solvent of the type described above, and by coating this onto the surface of a conductive sheet member which forms the first comb shaped conductive type layer member 42 and/or the second comb shaped conductive type layer member 43 by a coating method such as spray coating, roller coating, or brush coating or the like, and by adhering them together; or by a method of making an adhesive sheet by forming the electrically adhesive material into sheet form, interposing this in between the conductive sheet members which form the first conductive type layer member 42 and/or the second conductive type layer member 43, and then heating them up.

The covering layer 45 is made as a covering sheet which is formed from an electrically insulating coating or an electrically insulating material made from an electrically insulating substance whose electrical insulation characteristic decreases upon reaction with battery fluid (acid liquid). The same electrically insulating material as described with reference to the first embodiment may be used.

Next, the operation of this battery liquid leakage sensor 40 shown in FIG. 2 will be explained.

When liquid leakage from the upper surface of the battery or a crack or the like occurs, the battery fluid 12 which has leaked out drips down to this battery liquid leakage sensor 40 which is disposed on the internal bottom surface of a case in which the battery is housed, or upon the outer side surface of the battery.

The battery fluid 12 which has dripped down reacts with the covering layer 45 of the battery liquid leakage sensor 40, and, after it has dissolved it, permeates through the first conductive layer member 42 and arrives at the adhesive layer 44.

The battery fluid 12 which has thus arrived at the adhesive layer 44 reacts with the adhesive layer 44 and dissolves it, and then arrives at the surface of the second conductive layer member 43. At this time, the first conductive layer member 42 and the second conductive layer member 43 are electrically connected together via the solution of the adhesive which has been dissolved in the battery fluid 12. Due to this conductivity, an electrical current flows from the battery 33 through the light emitting diode 31 of the notification device 30, and the light emitting diode 31 emits light. And, due to this emission of light, the occurrence of liquid leakage from the battery is notified to maintenance personnel.

Since, in the battery liquid leakage sensor 40 of the above type, the first conductive layer member 42 and the second conductive layer member 43 are adhered together by the adhesive layer 44 which is made from an electrically insulating material whose electrical insulation characteristic decreases on reaction with battery fluid, accordingly, in the normal state, the first conductive layer member 42 and the second conductive layer member 43 are adhered together in the mutually isolated state by this adhesive layer 44; while, if battery fluid 12 has leaked from the battery, due to the adhesive layer 44 reacting with the battery fluid 12, the first conductive layer member 42 and the second conductive layer member 43 are electrically connected together via the adhesive liquid in which the battery fluid 12 has dissolved. Thereby, liquid leakage from the battery can be quickly detected.

Third Embodiment

Figure 5:
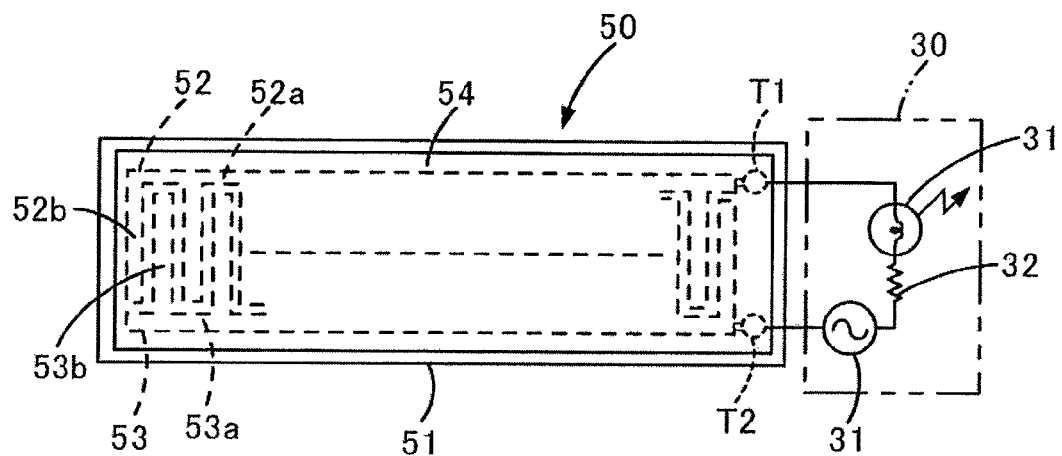
FIG. 5 is a plan view showing the upper surface of another example of the acid liquid leakage sensor of the present invention.

FIG. 5 is a plan view showing the upper surface of a battery liquid leakage sensor 50 which is a third embodiment of the acid liquid leakage sensor of the present invention. The distinguishing feature of this battery liquid leakage sensor is that the previously described first conductive member and second conductive member are respectively made as a first comb shaped electrode 52 and a second comb shaped electrode 53.

This battery liquid leakage sensor 50 may, for example, have a schematic structure which comprises: a base member 51 in sheet form, about 80 cm×60 cm; a first comb shaped electrode 52 and a second comb shaped electrode 53 (see FIG. 6) each of which is shaped in the general form of a comb and is made on the surface of the base member 51; a covering layer 54 which covers the surface of the base member 51 and extends over both of the first comb shaped electrode 52 and the second comb shaped electrode 53, and which maintains a state of electrical insulation or high electrical resistance between the first comb shaped electrode 52 and the second comb shaped electrode 53; a terminal T1 for the first comb shaped electrode 52; a terminal T2 for the second comb shaped electrode 53; and a notification device 30 which is connected by lead wires to the terminal T1 of the first comb shaped electrode 52 and to the terminal T2 of the second comb shaped electrode 53. The base member 51 is made from a material as previously described.

The notification device 30 comprises a lamp 31, a protective resistor 32, and a power supply 33 such as the commercial AC power supply. The voltage of the power supply 33 is always applied between the first comb shaped electrode 52 and the second comb shaped electrode 53 via the lamp 31 and the protective resistor 32. It should be understood that, although the explanation herein is given in terms of the power supply 33 being the commercial AC power supply, it could alternatively be a DC power supply.

Figure 6:
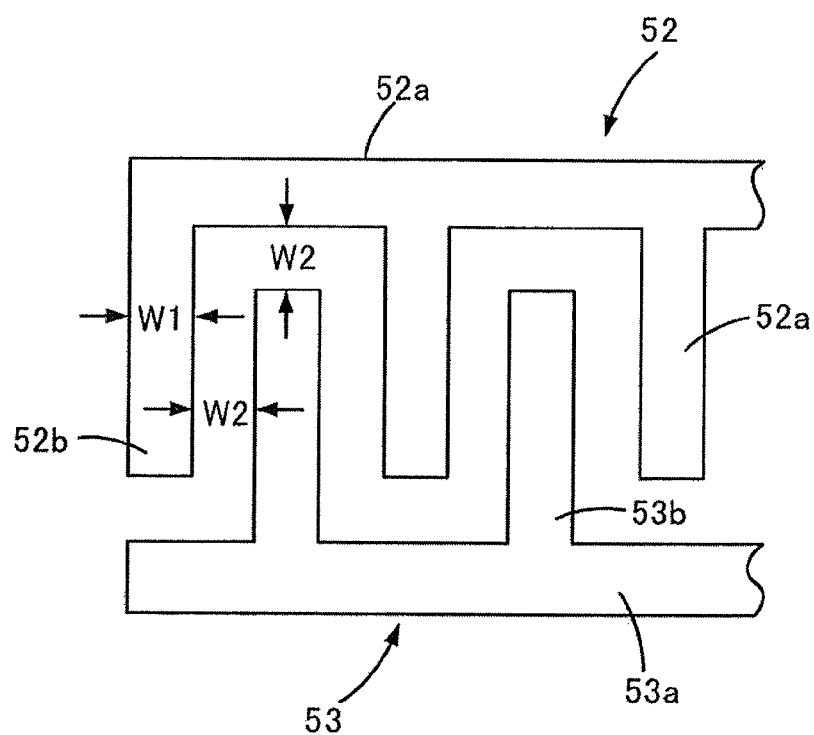
FIG. 6 is a plan view showing the upper surface of an example of a conductive member which is used in the present invention.

The first comb shaped electrode 52 and the second comb shaped electrode 53 are formed, by plating or printing or a combination thereof or the like, from an electrically conductive material selected from a metal such as copper, aluminum, iron, or the like, on the surface of the base member 51. The first comb shaped electrode 52 and the second comb shaped electrode 53 are made in comb shapes, as shown in FIG. 6.

The first comb shaped electrode 52 and the second comb shaped electrode 53 are of the same shape, and are positioned so that the teeth of their comb shapes face one another and mutually engage. Accordingly, hereinafter, only the first comb shaped electrode will be described.

The first comb shaped electrode 52 comprises a common electrode member 52a and a plurality of fine electrode members 52b which extend at fixed intervals from this common electrode member 52a. Each of these fine electrode members 52b extends a fixed distance in the same direction away from the common electrode member 52a, and, between them, the fine electrode members 53b of the second comb shaped electrode 53 are interleaved in the opposite direction. The gaps between each fine electrode member 53b and the neighboring fine electrode members 52b are almost equal. And the common electrode member 52a of the first comb shaped electrode 52 and the common electrode member 53a of the second comb shaped electrode 53 are arranged so as to be almost parallel to one another.

The width W1 of the common electrode member 52a and the width W1 of the fine electrode members 52b, and the gap W2 between each of the fine electrode members 53b and the neighboring fine electrode members 52b and the gap W2 between the common electrode member 52a and the fine electrode members 53b, are greater than or equal to 0.5 mm and less than or equal to 8 mm, and desirably are greater than or equal to 1.5 mm and less than or equal to 5 mm. It is desirable for these widths W1 and W2 to be small, since then it is possible to detect a small leakage of liquid; but, if they are less than 0.5 mm, then when making the comb shaped electrodes by a method such as printing or etching or the like, or during handling after manufacture, there is a danger of a short circuit between the first comb shaped electrode 52 and the second comb shaped electrode 53. Moreover, with these first and second comb shaped electrodes 52 and 53 having a width greater than or equal to 0.5 mm, if their thickness is normal, for example several tens of micrometers or more, then there is no problem in practice with their resistance values.

If the gap between the electrodes is too narrow, this liquid leakage sensor 50 according to the present invention will have a capacitance which cannot be ignored, since the covering layer 54 is present between the electrodes which keeps them in an insulated or high resistance state. When this capacitance becomes large in this manner, leakage of liquid may be mistakenly detected; and, although there is some dependence upon the thickness of the comb shaped electrodes, with a normal electrode thickness of for example from about 10 μm to about 50 μm, there is no problem in practice, provided that the gap W2 between the fine electrode members 52b and the neighboring fine electrode members 53b, and the gap W2 between the common electrode member 52a and the fine electrode members 53b, are greater than or equal to 1.5 mm. In other words, if this gap W2 is greater than or equal to 1.5 mm, the capacitance which is created between the comb shaped electrodes 52 and 53, in practice, is of a magnitude which does not create any problem.

Furthermore, from the point of view of the accuracy and the speed of detection of leakage of acid liquid, the width W1 and the gap W2 are desirably less than or equal to 8 mm, and more desirably less than or equal to 5 mm. In particular, it is not desirable for the widths W1 and W2 to be greater than 8 mm, since from experience it has been found that, occasionally, it may be impossible to detect a very small leakage of liquid.

With regard to the electrically insulating material, the explanation thereof will be omitted, since one of the type described with regard to the first embodiment, or an electrically insulating adhesive layer as described with regard to the second embodiment, or a coating material layer may be utilized.

Next, the operation of this battery liquid leakage sensor 50 according to the third embodiment shown in FIG. 5 will be explained.

When liquid leakage from the upper surface of the battery or from a crack occurs, the battery fluid 12 which has leaked out drips down to the battery liquid leakage sensor 50 which is disposed on the internal bottom surface of the case in which the battery is housed, or on the external side surface of the battery.

The battery fluid 12 which has thus dripped down reacts with the covering layer 54 of the battery liquid leakage sensor 50 and dissolves it, and arrives at the surfaces of the first comb shaped electrode 52 and the second comb shaped electrode 53. At this time, the first comb shaped electrode 52 and the second comb shaped electrode 53 become electrically connected together via the solution of the electrically insulating material which includes some of the battery fluid 12.

Due to this conductivity, a current flows in the lamp 31 of the notification device 30 from the AC power supply 33, and the lamp 31 is thereby illuminated. Due to this illumination, the occurrence of liquid leakage from the battery is notified to the maintenance personnel.

With the above type of battery liquid leakage sensor 50, since the first comb shaped electrode 52 and the second comb shaped electrode 53 are covered over by the covering layer 54 which is made from an electrically insulating material whose electrical insulation characteristic decreases upon reaction with battery fluid, accordingly, in the normal state, the first comb shaped electrode 52 and the second comb shaped electrode 53 are protected by this covering layer 54; while, if battery fluid 12 has leaked from the battery, due to the covering layer 54 reacting with the battery fluid 12, the first comb shaped electrode 52 and the second comb shaped electrode 53 are electrically connected together via the battery fluid 12. Thereby, liquid leakage from the battery can be quickly detected.

Fourth Embodiment

Figure 7:
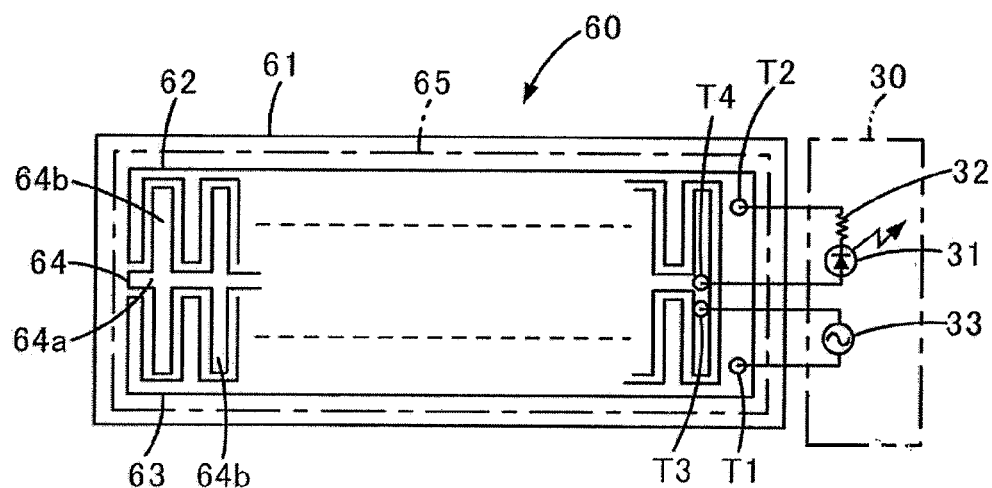
FIG. 7 is a plan view showing the upper surface of another example of the acid liquid leakage sensor of the present invention.

FIG. 7 is a plan view showing another example of a battery liquid leakage sensor, which is an acid liquid leakage sensor according to the present invention; first, this will be explained in outline. This battery liquid leakage sensor 60 comprises, on the surface of a base member 61 in sheet form which is the same as the base member of the above embodiments, a first comb shaped electrode 62 which constitutes a first conductive member, a second comb shaped electrode 63 which constitutes a second conductive member, and a third comb shaped electrode 64; and these comb shaped electrodes 62 through 64 are covered over with a continuous covering layer 65 which is electrically insulating or has high electrical resistance.

For ease of understanding, the comb shaped electrodes 62 through 64 are shown by solid lines, while the covering layer 65 is shown by a single dotted broken line. The first comb shaped electrode 62 and the second comb shaped electrode 63 are connected at one end, where terminals T1 and T2 are provided. Furthermore, terminals T3 and T4 are also provided to the third comb shaped electrode 64. The power supply 33 of the notification device 30 is connected by lead wires to the terminals T1 and T3, while the light emitting diode 31 of the notification device 30 is connected to the terminals T2 and T4 by lead wires and via a protective resistor 32. It is convenient for the terminals T1 and T2 to be a male plug which is plugged into the socket of the commercial AC power supply. It is convenient to use eyelet for the terminals T3 and T4. It should be understood that, although in this explanation the power supply 33 has been described as being the commercial AC power supply, it could also be a DC power supply.

The first comb shaped electrode 62 the second comb shaped electrode 63, and the third comb shaped electrode 64 may be made by plating, etching, screen printing, or the like from an electrically conductive material such as a metal like copper, aluminum, iron, or the like.

The first comb shaped electrode 62 and the second comb shaped electrode 63 are of the same shape as the comb shaped electrodes of the above described third embodiment, while the third comb shaped electrode 64 comprises a common electrode member 64a and fine electrode members 64b which extend therefrom in both opposite directions at fixed intervals. This third comb shaped electrode 64 is positioned in the middle, and the fine electrode members of the first comb shaped electrode 62 and the second comb shaped electrode 63 which are positioned on both sides of the third comb shaped electrode 64, are inserted in between the fine electrode members 64b thereof. The widths of these gaps are the same as in the third embodiment.

For the electrically insulating material, one which is the same as that described with regard to the first embodiment, or an adhesive material layer which is electrically insulating as described with regard to the second embodiment, or a coating material layer, may be used; and accordingly the explanation thereof will be omitted.

Next, the operation of this battery liquid leakage sensor 60 according to the fourth embodiment shown in FIG. 7 will be explained.

When liquid leakage from the upper surface of the battery or from a crack occurs, the battery fluid 12 which has leaked out drips down to the battery liquid leakage sensor 60 which is disposed on the internal bottom surface of the case in which the battery is housed, or on the external side surface of the battery.

The battery fluid 12 which has thus dripped down reacts with the covering layer 65 of the battery liquid leakage sensor 60 and dissolves it, and thereby electrically connects together the first comb shaped electrode 62 or the second comb shaped electrode 63, and the third comb shaped electrode 64.

Due to this conductivity, a current flows in the light emitting diode 31 of the notification device 30 from the power supply 33, and the light emitting diode 31 thereby emits light. Due to this emission of light, the occurrence of liquid leakage from the battery is notified to the maintenance personnel.

This fourth embodiment is applicable when the detection area for liquid leakage is comparatively large.

Fifth Embodiment

Next, an embodiment of the acid liquid leakage sensor whose width is small, so that it is suitable for being wound through almost a full turn around the battery, will be explained with reference to FIG. 8.

A first comb shaped electrode 72 and a second comb shaped electrode 73 are made on the surface of an easily bent sheet form base member 71, and these electrodes 72 and 73 comprise electrode members 72a, 72b, 73a, and 73b which extend along their length direction, with their one ends being short circuited together while their other ends are left open, so that the electrodes 72 and 73 are mutually inserted into one another from their open ends.

Terminals T1 and T2 are provided at the one end of the first comb shaped electrode 72 and the second comb shaped electrode 73, and a notification device 30 of the same structure as in the previous embodiments is connected to these terminals T1 and T2.

Figure 8:
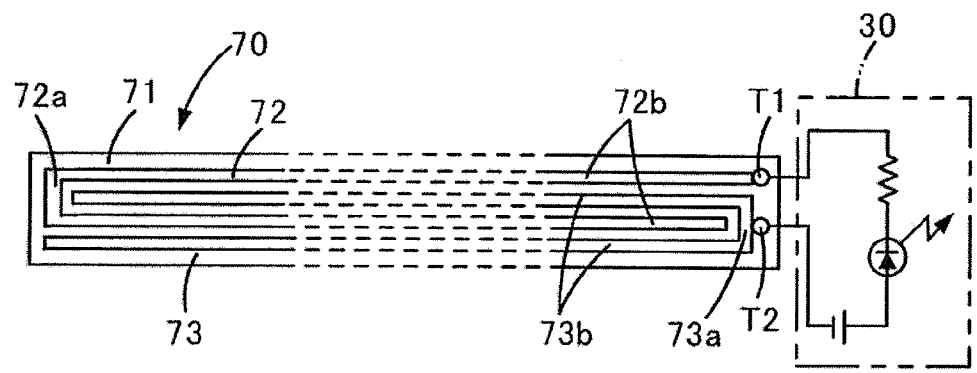
FIG. 8 is a plan view showing the upper surface of another example of the acid liquid leakage sensor of the present invention.

Although in FIG. 8 the terminal T1 is shown at the position on the open side, since it is supposed that the first comb shaped electrode 72 and the second comb shaped electrode 73 are wound through almost a full turn around the battery (not shown in the figure), accordingly, the terminal T1 may be formed on a position 72a which is shorted by the two electrode members 72b. It should be understood, in FIG. 8, the electrically insulating material is omitted, but actually the base member 71, the first comb shaped electrode 72, and the second comb shaped electrode 73 are covered over by electrically insulating material of the same type as previously described.

Furthermore, if the side of the covering layer (not shown in the figure) is wound directly onto the case of the battery (also not shown), with the side of the base member 71 facing outward, then it becomes possible to detect acid liquid which spreads out around the case more quickly and reliably.

With the first comb shaped electrode 72 and the second comb shaped electrode 73 of this embodiment, since the electrode members 72a, 72b, 73a, and 73b extend along the length direction, and no fine electrode members as in the previous embodiments are present, accordingly this acid liquid leakage sensor is easy to wind around the battery, and moreover can easily be tightly contacted thereagainst. It should be understood that the widths of the electrode members 72a, 72b, 73a, and 73b, and the gaps between them, are the same as in the previous embodiments.

Moreover, with the battery liquid leakage sensor 70 of the type described above, since the first comb shaped electrode 72 and the second comb shaped electrode 73 are covered with the electrically insulating material whose electrical insulation characteristic (or high resistance characteristic) decreases upon reaction with battery fluid, accordingly, in the normal state, if acid liquid leaks from the case of the battery (not shown in the figure) and spreads onto the covering layer, and dissolves the electrically insulating material, then, due to the first comb shaped electrode 72 and the second comb shaped electrode 73 reacting with the battery fluid 12, the first comb shaped electrode 72 and the second comb shaped electrode 73 become electrically connected together via the battery fluid 12. Due to this, liquid leakage from the battery can be detected quickly and moreover reliably.

Sixth Embodiment

Figure 9:
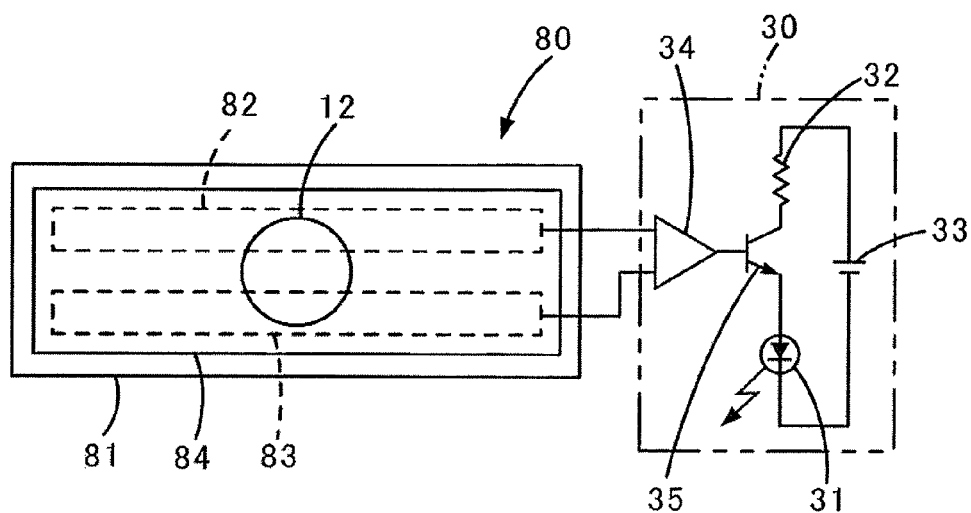
FIG. 9 is a plan view showing the upper surface of another example of the acid liquid leakage sensor of the present invention.

FIG. 9 is a figure for explanation of an example of a battery liquid leakage sensor, which is an acid liquid leakage sensor according to the present invention. This battery liquid leakage sensor 80 has a schematic structure which comprises: a base member 81 of sheet form; a first conductive member 82 and a second conductive member 83 made from a conductive material having an ionization tendency which is different from that of the first conductive member 82, both of band form, and both arranged upon the surface of the base member 81 in parallel with a certain gap between them; a covering layer 84 which covers over the surface of the base member 81, over both the first conductive member 82 and the second conductive member 83, and which maintains a state of electrical insulation or high resistance between the first conductive member 82 and the second conductive member 83; and a notification device 30 which is connected to the first conductive member 82 and the second conductive member 83 by lead wires.

The notification device 30 comprises a voltage amplifier 34 which amplifies any electromotive force generated between the first conductive member 82 and the second conductive member 83, a semiconductor switch 35 like a transistor which is connected in series to the output side of this voltage amplifier 34, a light emitting diode 31, a protective resistance 32, and a DC power supply such as a battery. In the normal state, in other words in the state in which, absent any leakage of liquid from the battery, the electrical insulation characteristic of the covering layer 84 is not decreased, the electromotive force between the first conductive member 82 and the second conductive member 83 is zero.

Since the base member 81 is the same as in the previous embodiments, and is made in sheet form from a material which is impervious to battery fluid and moreover is flame-retardant, accordingly flame-retardant polyester or flame-retardant polyimide may, for example, be used as this material.

The first conductive member 82 is a band shaped member which is made from an electrically conductive material such as a metal like copper, aluminum, iron or the like, while the second electrically conductive member 83 is a band shaped member which is made from an electrically conductive material such as a metal which has a different ionization tendency from the electrically conductive material which is used for the first conductive member.

The covering layer 84 is made from an electrically insulating material whose electrical insulation characteristic decreases upon reaction with battery fluid (acid liquid), and it is a coating layer which is formed by coating an electrically insulating coating material made from this electrically insulating material upon the surfaces of the base member 81, the first conductive member 82, and the second conductive member 83, and by drying; or, alternatively, it may be formed by adhering a covering sheet formed from the electrically insulating material upon the surfaces of the base member 81, the first conductive member 82, and the second conductive member 83.

In normal conditions, this covering layer 84 serves to cover over and protect, and also electrically to insulate, the first conductive member 82 and the second conductive member 83; while, if battery fluid 12 has leaked from the battery, it reacts with this battery fluid 12 so that its conductivity increases.

Here, in the reaction between the battery fluid and the electrically insulating material, there is a neutralization reaction or a decomposition reaction or the like. In order reliably to establish electrical conduction by the battery fluid 12 between the first conductive member 82 and the second conductive member 83, it is desirable for the electrically insulating material to be one which dissolves upon reaction with the battery fluid.

As the electrically insulating material which reacts with the battery fluid and dissolves, a material which includes a macromolecular compound having a basic functional group is appropriate. This is because, due to the fact that the basic functional group experiences neutralization action due to an acid liquid such as battery fluid or the like, the electrically insulating material can easily attain a state in which it is soluble in water, so that its resistance with respect to acid liquid or the like becomes extremely weak. With regard to the macromolecular compound which has a basic functional group, since it is the same as previously described, explanation will here be omitted.

Next, the operation of this battery liquid leakage sensor 80 shown in FIG. 9 will be explained.

When liquid leakage from the upper surface of the battery or from a crack occurs, the battery fluid 12 which has leaked out drips down to the battery liquid leakage sensor 80 which is disposed on the internal bottom surface of the case in which the battery is housed, or on the external side surface of the battery.

The battery fluid 12 which has thus dripped down reacts with the covering layer 84 of the battery liquid leakage sensor 80 and dissolves it, and arrives at the surfaces of the first conductive member 82 and the second conductive member 83. At this time, the first conductive member 82 and the second conductive member 83 become electrically connected together via the battery fluid 12, and an electromotive force is generated, due to the difference in ionization tendency between the first conductive member 82 and the second conductive member 83. The electromotive force which is generated at this time is 0.5 to 0.8 V, and this electromotive force is amplified by the voltage amplifier 34 of the notification device 30 and turns on the semiconductor switch 35, so that the DC power supply 33 causes an electrical current to flow through the protective resistance 32, the semiconductor switch 35, and the light emitting diode 31. Due to this, the light emitting diode 31 emits light, and, due to this emission of light, the occurrence of liquid leakage from the battery is notified to the maintenance personnel.

With the above type of battery liquid leakage sensor 80, since the first conductive member 82 and the second conductive member 83 are covered over by the covering layer 84 which is made from an electrically insulating material whose electrical insulation characteristic decreases upon reaction with battery fluid, accordingly, in the normal state, the first conductive member 82 and the second conductive member 83 are protected by this covering layer 84, and no electromotive force is generated between the first conductive member 82 and the second conductive member 83. On the other hand, if battery fluid 12 has leaked from the battery, due to the covering layer 84 reacting with the battery fluid 12, the first conductive member 82 and the second conductive member 83 are electrically connected together via the battery fluid 12, and an electromotive force is created from the difference in ionization tendencies between the first conductive member 82 and the second conductive member 83. Due to this, it is possible to detect liquid leakage from the battery quickly, even though, as in this embodiment, no power supply is provided.

Seventh Embodiment

Figure 10:
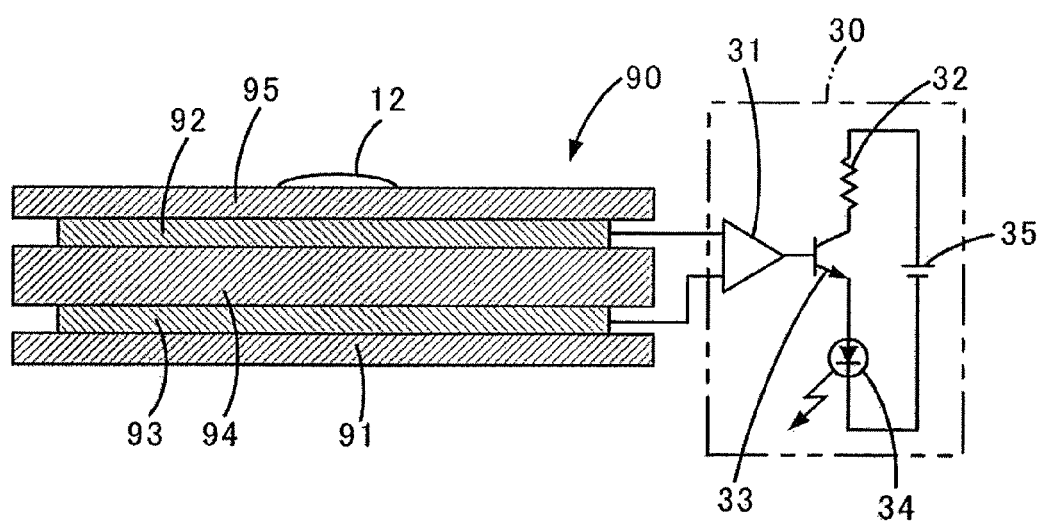
FIG. 10 is a sectional side view showing another example of the acid liquid leakage sensor of the present invention.
Figure 11:
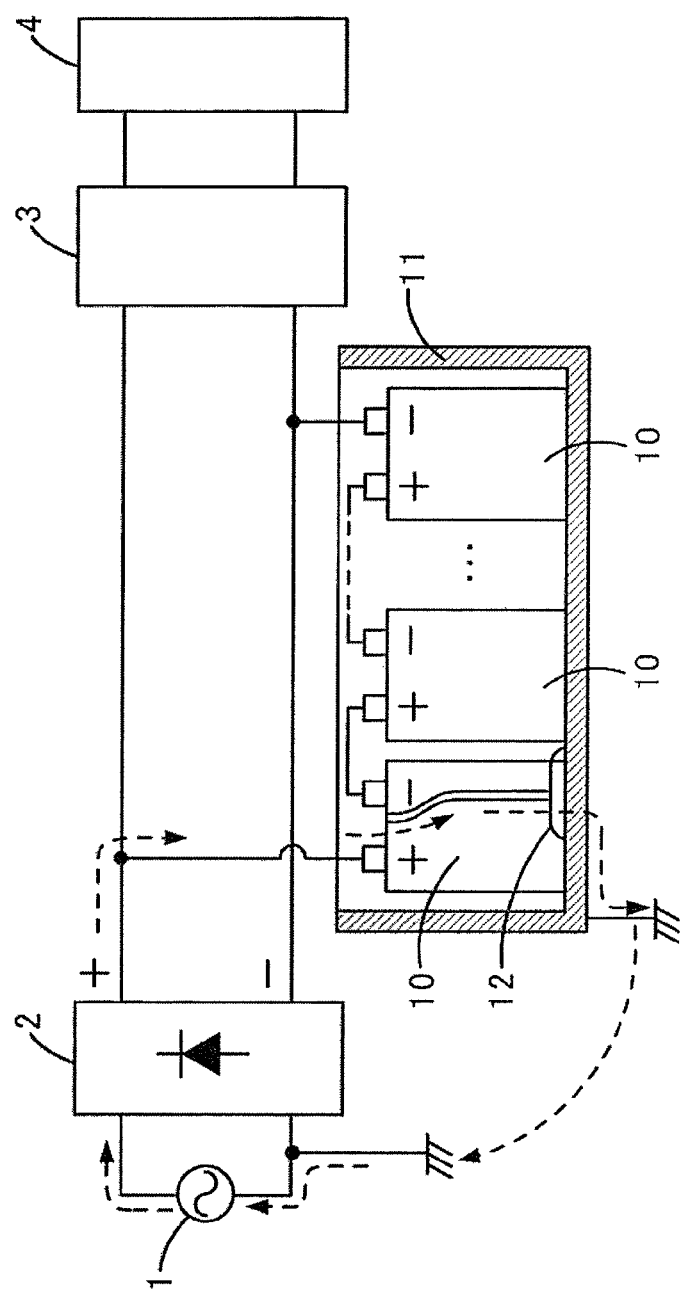
FIG. 11 is a schematic structural figure showing an example of an uninterruptible power supply.

FIG. 10 is a side view showing another example of a battery liquid leakage sensor, which is an acid liquid leakage sensor of the present invention. This battery liquid leakage sensor 90 has a schematic structure which comprises: a base member 91 of sheet form; a first conductive layer member 92 which is permeable to battery fluid; a second conductive layer member 93 made from an electrically conductive material having an ionization tendency which is different from that of the electrically conductive material used for the first conductive layer; an adhesive layer 94 which is sandwiched between the first conductive layer member 92 and the second conductive member 93, and which sticks to them while in a state of electrical insulation or high resistance; a covering layer 95 which covers the surface of the first conductive layer member 92; and a notification device 30 which is connected to the first conductive layer member 92 and the second conductive layer member 93 by lead wires.

The first conductive member 92 is a conductive sheet member which is made from an electrically conductive material such as a metal like copper, aluminum, iron or the like, while the second electrically conductive member 93 is an electrically conductive material which has a different ionization tendency from the electrically conductive material which is used for the first conductive member 92.

As the conductive sheet member which constitutes the first conductive layer member 92, in order for it to be permeable to battery fluid, there may be used metal in which a large number of punched holes 45 are formed, as shown in FIG. 3, or metal in mesh form, as shown in FIG. 4, or a porous metal.

The adhesive layer 94 is made from an adhesive sheet which is formed from an adhesive which is electrically insulating, or an electrically insulating material, made from an electrically insulating material whose electrical insulation characteristic decreases upon reaction with battery fluid (acid liquid).

This adhesive layer 94, in the normal state, adheres together the first conductive layer member 92 and the second conductive layer member 93, and they are electrically separated; but, if battery fluid 12 has leaked from the battery, due to this layer reacting with the battery fluid 12 and becoming a resistor, the adhesive layer 94 puts the first conductive layer member 92 and the second conductive layer member 93 into an electrically conducting state, via its resistance. Here, if there is a danger that, due to the adhesive layer 94 dissolving upon reaction with the battery fluid 12, the first conductive layer member 92 and the second conductive layer member 93 should short circuit together, then small spheres of an electrically insulating material may be mixed in with the adhesive layer 94. Furthermore, the adhesive layer 94 may be made from a material as described in detail above. It should be understood that it is desirable for the covering layer 95 to be one which dissolves upon reaction with the battery fluid 12.

The first conductive layer member 92 and the second conductive layer member 93 are formed by printing or the like. In this case, the printing material may be made in advance as a paste by mixing a powder of a metallic material selected from calcium, potassium, zinc, copper, iron, aluminum, tin, nickel, and magnesium into resin, and the first conductive layer member 92 and the second conductive layer member 93 may be formed on the base member 91 by a method using this material, such as screen printing or the like.

Furthermore, it is possible to form the conductive layer members from various different types of metallic material, by making the first conductive layer member 92 and the second conductive layer member 93 over the base member 91 by a method such as plating and etching or the like of the same metallic material which is selected from zinc, copper, iron, aluminum, tin, nickel, and magnesium; and, by over either one of these metallic materials, printing the previously described printing material, in other words, a printing material in which a powder of a metallic material, selected from calcium, potassium, zinc, copper, iron, aluminum, tin, nickel, and magnesium, and moreover different from the above metallic material, is mixed with a resin which becomes a binder.

The description of the operation of this battery liquid leakage sensor will be omitted, since is the same as previously described.

It should be understood that the first conductive member 82 or 92, and the second conductive member 83 or 93, may also be a comb shaped conductive member or a conductive layer member, as shown in FIGS. 5 and 6.

The acid liquid leakage sensor of the present invention is not to be considered as being limited to these embodiments. For example, apart from its application as a sensor which detects leakage of liquid from a battery, it could also be applied as a sensor which detects leakage of a liquid from a device in which acid liquid is charged.

Furthermore, the notification means of the acid liquid leakage sensor of the present invention is not to be considered as being limited to the notification devices 30 shown in the figures by way of example; any suitable device may be used, provided that it is a device which can notify the leakage of liquid to the exterior, when the first conductive member and the second conductive member are electrically connected together via the battery fluid 12: a notification device may be utilized which is equipped with any warning device instead of a light emitting diode, such as a bulb, a buzzer, a siren or the like; or a wireless notification device or the like may be used.

CONCRETE EMBODIMENTS

In the following, the present invention will be explained in detail by describing Concrete Embodiments thereof.

First Concrete Embodiment 1

Synthesis of the Macromolecular Compound Having a Basic Functional Group 1120 g of isopropyl alcohol, 96 g of styrene, 144 g of n-butyl methacrylate, and 1 g of dimethyl amino ethyl methacrylate were put into a two liter round bottom four aperture flask fitted with a nitrogen feed tube, a thermometer, a cooling tube, and a mixing device, and were heated up to 80° C. Then, every 30 minutes, 1 g of ABN-E (an azo compound made by Nippon Hydrogen Industries K.K.: The name of this corporation is changed to Japan Finechem Company. Inc.) was added, for a total of five times, and thereafter, after having been kept in the flask for four hours at a temperature of 80° C., the mixture was cooled down to normal temperature, so that the reaction was terminated.

Preparation of the Electrically Insulating Coating Material

By using a paint shaker, 1 part by weight of MA-100 (carbon black made by Mitsubishi Chemical K.K.) was dispersed in 99 parts by weight of a solution of the macromolecular compound obtained as described above, and a black colored insulating coating material was obtained. The glass transition temperature of the macromolecular compound which was obtained was 37° C., and 50% by weight of the monomer component included in this macromolecular compound was a monomer which had a basic functional group.

Concrete Embodiment 2

Synthesis of the Macromolecular Compound Having a Basic Functional Group 1120 g of isopropyl alcohol, 240 g of styrene, and 240 g of dimethyl amino ethyl methacrylate were put into a two liter round bottom four aperture flask fitted with a nitrogen feed tube, a thermometer, a cooling tube, and a mixing device, and were heated up to 80° C. Then, every 30 minutes, 1 g of ABN-E (an azo compound made by Nippon Hydrogen Industries K.K.) was added, for a total of five times, and thereafter, after having been kept in the flask for four hours at a temperature of 80° C., the mixture was cooled down to normal temperature, so that the reaction was terminated.

Preparation of the Electrically Insulating Coating Material

A black colored electrically insulating coating material was prepared in the same manner as in the first Concrete Embodiment.

The glass transition temperature of the macromolecular compound which was obtained was 63° C., and 50% by weight of the monomer component included in this macromolecular compound was a monomer which had a basic functional group.

Concrete Embodiment 3

Synthesis of the Macromolecular Compound Having a Basic Functional Group 1120 g of isopropyl alcohol, 240 g of butyl acrylate, and 240 g of dimethyl amino ethyl methacrylate were put into a two liter round bottom four aperture flask fitted with a nitrogen feed tube, a thermometer, a cooling tube, and a mixing device, and were heated up to 80° C. Then, every 30 minutes, 1 g of ABN-E (an azo compound made by Nippon Hydrogen Industries K.K.) was added, for a total of five times, and thereafter, after having been kept in the flask for four hours at a temperature of 80° C., the mixture was cooled down to normal temperature, so that the reaction was terminated.

Preparation of the Electrically Insulating Coating Material

A black colored electrically insulating coating material was prepared in the same manner as in the first Concrete Embodiment.

The glass transition temperature of the macromolecular compound which was obtained was −17° C., and 50% by weight of the monomer component included in this macromolecular compound was a monomer which had a basic functional group.

Concrete Embodiment 4

Synthesis of the Macromolecular Compound Having a Basic Functional Group 1120 g of isopropyl alcohol, 144 g of styrene, and 336 g of dimethyl amino ethyl methacrylate were put into a two liter round bottom four aperture flask fitted with a nitrogen feed tube, a thermometer, a cooling tube, and a mixing device, and were heated up to 80° C. Then, every 30 minutes, 1 g of ABN-E (an azo compound made by Nippon Hydrogen Industries K.K.) was added, for a total of five times, and thereafter, after having been kept in the flask for four hours at a temperature of 80° C., the mixture was cooled down to normal temperature, so that the reaction was terminated.

Preparation of the Electrically Insulating Coating Material

A black colored electrically insulating coating material was prepared in the same manner as in the first Concrete Embodiment.

The glass transition temperature of the macromolecular compound which was obtained was 46° C., and 70% by weight of the monomer component included in this macromolecular compound was a monomer which had a basic functional group.

Concrete Embodiment 5

Preparation of the Electrically Insulating Coating Material

By using a paint shaker, 2 parts by weight of MA-100 (carbon black made by Mitsubishi Chemical K.K.) and 22 parts by weight of NS #600 (calcium carbonate powder of average particle diameter 1.48 micrometers, made by Nitto Funka Kogyo K.K.) were dispersed in 76 parts by weight of a solution of the macromolecular compound having a basic functional group obtained in the second Concrete Embodiment, and a black colored insulating coating material was obtained. The glass transition temperature of the macromolecular compound which was obtained was 63° C., and 50% by weight of the monomer component included in this macromolecular compound was a monomer which had a basic functional group. Furthermore, as an extender, calcium carbonate was included in the electrically insulating coating material to 50% by weight.

Concrete Embodiment 6

Preparation of the Electrically Insulating Coating Material

By using a paint shaker, 1 part by weight of MA-100 (carbon black made by Mitsubishi Chemical K.K.) and 3 parts by weight of NS #600 (calcium carbonate powder of average particle diameter 1.48 micrometers, made by Nitto Funka Kogyo K.K.) were dispersed in 96 parts by weight of the macromolecular compound having a basic functional group obtained in the second Concrete Embodiment, and a black colored insulating coating material was obtained. The glass transition temperature of the macromolecular compound which was obtained was 63° C., and 50% by weight of the monomer component included in this macromolecular compound was a monomer which had a basic functional group. Furthermore, as an extender, calcium carbonate was included in the electrically insulating coating material to 7% by weight.

Concrete Embodiment 7

Preparation of the Electrically Insulating Coating Material

By using a paint shaker, 2 parts by weight of MA-100 (carbon black made by Mitsubishi Chemical K.K.) and 33 parts by weight of NS #600 (calcium carbonate powder of average particle diameter 1.48 micrometers, made by Nitto Funka Kogyo K.K.) were dispersed in 65 parts by weight of a solution of the macromolecular compound having a basic functional group obtained in the second Concrete Embodiment, and a black colored insulating coating material was obtained. The glass transition temperature of the macromolecular compound which was obtained was 63° C., and 50% by weight of the monomer component included in this macromolecular compound was a monomer which had a basic functional group. Furthermore, as an extender, calcium carbonate was included in the electrically insulating coating material to 63% by weight.

Comparison Example 1

Synthesis of the Macromolecular Compound Having a Basic Functional Group 1120 g of isopropyl alcohol, 456 g of styrene, and 24 g of dimethyl amino ethyl methacrylate were put into a two liter round bottom four aperture flask fitted with a nitrogen feed tube, a thermometer, a cooling tube, and a mixing device, and were heated up to 80° C. Then, every 30 minutes, 1 g of ABN-E (an azo compound made by Nippon Hydrogen Industries K.K.) was added, for a total of five times, and thereafter, after having been kept in the flask for four hours at a temperature of 80° C., the mixture was cooled down to normal temperature, so that the reaction was terminated.

Preparation of the Electrically Insulating Coating Material

A black colored electrically insulating coating material was prepared in the same manner as in the first Concrete Embodiment.

The glass transition temperature of the macromolecular compound which was obtained was 101° C., and 5% by weight of the monomer component included in this macromolecular compound was a monomer which had a basic functional group.

Comparison Example 2

Synthesis of the Macromolecular Compound Having a Basic Functional Group 1120 g of isopropyl alcohol, 288 g of styrene, 168 g of n-butyl methacrylate, and 24 g of dimethyl amino ethyl methacrylate were put into a two liter round bottom four aperture flask fitted with a nitrogen feed tube, a thermometer, a cooling tube, and a mixing device, and were heated up to 80° C. Then, every 30 minutes, 1 g of ABN-E (an azo compound made by Nippon Hydrogen Industries K.K.) was added, for a total of five times, and thereafter, after having been kept in the flask for four hours at a temperature of 80° C., the mixture was cooled down to normal temperature, so that the reaction was terminated.

Preparation of the Electrically Insulating Coating Material

A black colored electrically insulating coating material was prepared in the same manner as in the first Concrete Embodiment.

The glass transition temperature of the macromolecular compound which was obtained was 71° C., and 5% by weight of the monomer component included in this macromolecular compound was a monomer which had a basic functional group.

Method for Evaluation of the Coating Layers (A) Coating Processing and Coating Drying The electrically insulating coating materials of Concrete Embodiments 1 through 7 and Comparison Examples 1 and 2, diluted with isopropyl alcohol so as to have viscosity of 10 seconds with a Ford No. 4 cup at 20° C., were each uniformly coated by air spray coating upon a copper electrode and a film made of polyethylene terephthalate resin.

After spraying was completed, and the test piece was left for two hours at normal temperature, various types of experiment were performed. The experimental results are shown in Table 1.

(B) Methods of Evaluation for Coating Layer Experimental Parameters (1) Adhesion quality: the coating layer was cut into tesselations of 1 mm×1 mm×100 units, and the number of tessellations remaining after a cellophane tape peeling experiment was evaluated.

(2) Water resistance experiment: one milliliter of pure water at 25° C. was spotted onto the coating surface, and was wiped off after five minutes; and then the coating layer was cut into tesselations of 1 mm×1 mm×100 units, and the number of tessellations remaining after a cellophane tape peeling experiment was evaluated.

(3) Acid solubility: one milliliter of aqueous solution of dilute sulfuring acid (10% by weight) was spotted onto the coating surface, and the state of dissolution of the coating layer was relatively evaluated.

(4) Alkali resistance: one milliliter of aqueous solution of 1N potassium hydroxide was spotted onto the coating surface, and was wiped off after five minutes; and then the coating layer was cut into tesselations of 1 mm×1 mm×100 units, and the number of tessellations remaining after a cellophane tape peeling experiment was evaluated.

(5) Coating layer hardness: the hardness of the coating layer at normal temperature was evaluated.

(C) Decision Standards for Experiment Evaluation
○: satisfactory
Δ: not so good, but within usable range
x: unsatisfactory

TABLE 1

| | CONCRETE EMBODIMENT | | | | | | | COMPARISON EXAMPLE | |
|---|---|---|---|---|---|---|---|---|---|
| | 1 | 2 | 3 | 4 | 5 | 6 | 7 | 1 | 2 |
| ADHESION QUALITY, A COPPER ELECTRODE | ○ | ○ | ○ | ○ | ○ | ○ | ○ | Δ | ○ |
| ADHESION QUALITY, A PET FILM | ○ | ○ | ○ | ○ | ○ | ○ | ○ | Δ | ○ |
| WATER RESISTANCE | ○ | ○ | ○ | ○ | ○ | ○ | ○ | ○ | ○ |
| ACID SOLUBILITY | Δ | Δ | ○ | ○ | ○ | Δ | ○ | X | X |
| ALKALI RESISTANCE | ○ | ○ | ○ | ○ | ○ | ○ | ○ | ○ | ○ |
| COATING LAYER HARDNESS | ○ | ○ | X | ○ | ○ | ○ | Δ | ○ | ○ |

Concrete Embodiment 8

Synthesis of the Macromolecular Compound Having a Basic Functional Group 1120 g of isopropyl alcohol, 240 g of butyl acrylate, and 240 g of dimethyl amino ethyl methacrylate were put into a two liter round bottom four aperture flask fitted with a nitrogen feed tube, a thermometer, a cooling tube, and a mixing device, and were heated up to 80° C. Then, every 30 minutes, 1 g of ABN-E (an azo compound made by Nippon Hydrogen Industries K.K.) was added, for a total of five times, and thereafter, after having been kept in the flask for four hours at a temperature of 80° C., the mixture was cooled down to normal temperature, so that the reaction was terminated.

Preparation of the Electrically Insulating Adhesive

By using a paint shaker, 1 part by weight of MA-100 (carbon black made by Mitsubishi Chemical K.K.) was dispersed in 99 parts by weight of the macromolecular compound having a basic functional group which was obtained, and a black colored electrically insulating adhesive material was obtained. 50% by weight of the monomer component included in this macromolecular compound which was obtained was a monomer which had a basic functional group.

Concrete Embodiment 9

Synthesis of the Macromolecular Compound Having a Basic Functional Group 1120 g of isopropyl alcohol, 240 g of n-butyl methacrylate, and 240 g of dimethyl amino ethyl methacrylate were put into a two liter round bottom four aperture flask fitted with a nitrogen feed tube, a thermometer, a cooling tube, and a mixing device, and were heated up to 80° C. Then, every 30 minutes, 1 g of ABN-E (an azo compound made by Nippon Hydrogen Industries K.K.) was added, for a total of five times, and thereafter, after having been kept in the flask for four hours at a temperature of 80° C., the mixture was cooled down to normal temperature, so that the reaction was terminated.

Preparation of the Electrically Insulating Adhesive

A black colored adhesive was prepared in the same manner as in the eighth Concrete Embodiment.
50% by weight of the monomer component included in this macromolecular compound which was obtained was a monomer which had a basic functional group.

Concrete Embodiment 10

Synthesis of the Macromolecular Compound Having a Basic Functional Group 1120 g of isopropyl alcohol, 120 g of butyl acrylate, 120 g of 2-hydroxy ethyl acrylate, and 240 g of dimethyl amino ethyl methacrylate were put into a two liter round bottom four aperture flask fitted with a nitrogen feed tube, a thermometer, a cooling tube, and a mixing device, and were heated up to 80° C. Then, every 30 minutes, 1 g of ABN-E (an azo compound made by Nippon Hydrogen Industries K.K.) was added, for a total of five times, and thereafter, after having been kept in the flask for four hours at a temperature of 80° C., the mixture was cooled down to normal temperature, so that the reaction was terminated.

Preparation of the Electrically Insulating Adhesive

A black colored adhesive was prepared in the same manner as in the eighth Concrete Embodiment.
50% by weight of the monomer component included in the macromolecular compound which was obtained was a monomer which had a basic functional group.

Concrete Embodiment 11

Synthesis of the Macromolecular Compound Having a Basic Functional Group 1120 g of isopropyl alcohol, 120 g of n-butyl acrylate, and 360 g of dimethyl amino ethyl methacrylate were put into a two liter round bottom four aperture flask fitted with a nitrogen feed tube, a thermometer, a cooling tube, and a mixing device, and were heated up to 80° C. Then, every 30 minutes, 1 g of ABN-E (an azo compound made by Nippon Hydrogen Industries K.K.) was added, for a total of five times, and thereafter, after having been kept in the flask for four hours at a temperature of 80° C., the mixture was cooled down to normal temperature, so that the reaction was terminated.

Preparation of the Electrically Insulating Adhesive

A black colored adhesive was prepared in the same manner as in the eighth Concrete Embodiment.
75% by weight of the monomer component included in this macromolecular compound which was obtained was a monomer which had a basic functional group.

Concrete Embodiment 12

Preparation of the Electrically Insulating Adhesive

By using a paint shaker, 1 part by weight of MA-100 (carbon black made by Mitsubishi Chemical K.K.) and 23 parts by weight of NS #600 (calcium carbonate powder of average particle diameter 1.48 micrometers, made by Nitto Funka Kogyo K.K.) were dispersed in 76 parts by weight of the macromolecular compound having a basic functional group obtained in the eighth Concrete Embodiment, and a black colored electrically insulating adhesive material was obtained. 50% by weight of the monomer component included in this macromolecular compound which was obtained was a monomer which had a basic functional group. Furthermore, as an extender, calcium carbonate was included in the electrically insulating adhesive material to 50% by weight.

Concrete Embodiment 13

Preparation of the Electrically Insulating Adhesive

By using a paint shaker, 1 part by weight of MA-100 (carbon black made by Mitsubishi Chemical K.K.) and 3 parts by weight of NS #600 (calcium carbonate powder of average particle diameter 1.48 micrometers, made by Nitto Funka Kogyo K.K.) were dispersed in 96 parts by weight of a solution of the macromolecular compound having a basic functional group obtained in the eighth Concrete Embodiment, and a black colored electrically insulating adhesive material was obtained. 50% by weight of the monomer component included in this macromolecular compound which was obtained was a monomer which had a basic functional group. Furthermore, as an extender, calcium carbonate was included in the electrically insulating adhesive material to 7% by weight.

Concrete Embodiment 14

Preparation of the Electrically Insulating Adhesive

By using a paint shaker, 1 part by weight of MA-100 (carbon black made by Mitsubishi Chemical K.K.) and 34 parts by weight of NS #600 (calcium carbonate powder of average particle diameter 1.48 micrometers, made by Nitto Funka Kogyo K.K.) were dispersed in 65 parts by weight of a solution of the macromolecular compound having a basic functional group obtained in the eighth Concrete Embodiment, and a black colored electrically insulating adhesive material was obtained. 50% by weight of the monomer component included in this macromolecular compound which was obtained was a monomer which had a basic functional group. Furthermore, as an extender, calcium carbonate was included in the electrically insulating adhesive material to 63% by weight.

Comparison Example 3

Synthesis of the Macromolecular Compound Having a Basic Functional Group 1120 g of isopropyl alcohol, 456 g of n-butyl acrylate, and 24 g of dimethyl amino ethyl methacrylate were put into a two liter round bottom four aperture flask fitted with a nitrogen feed tube, a thermometer, a cooling tube, and a mixing device, and were heated up to 80° C. Then, every 30 minutes, 1 g of ABN-E (an azo compound made by Nippon Hydrogen Industries K.K.) was added, for a total of five times, and thereafter, after having been kept in the flask for four hours at a temperature of 80° C., the mixture was cooled down to normal temperature, so that the reaction was terminated.

Preparation of the Electrically Insulating Adhesive

A black colored adhesive was prepared in the same manner as in the eighth Concrete Embodiment.

5% by weight of the monomer component included in this macromolecular compound which was obtained was a monomer which had a basic functional group.

Method for Evaluation of the Adhesives (A) Method of Manufacture for the Experimental Plates for Evaluation Experimental plates for evaluation were manufactured by applying, using an air spray, electrically insulating adhesives which had been prepared according to Concrete Embodiments 8 through 14 and Comparison Example 3 uniformly to square copper plates, of thickness 0.3 millimeters and 100 millimeters on a side, with holes of diameter 3 millimeters pierced through them at gaps of 10 millimeters, and by sticking these copper plates with holes and with the adhesives applied to one another, after having performed drying for 5 hours in a circulation type drying oven at 60° C.

(B) Methods of Evaluation for Adhesive Experimental Parameters (1) Adhesive strength: the adhesion strength of the experimental plates at normal temperature was relatively evaluated.

(2) Water resistance: the experimental plates were dipped for two hours into water at 25° C., so that the adhesive layer was softened, and then the decrease in adhesive strength was relatively evaluated.

(3) Alkali resistance: the decrease of adhesion strength of the experimental plates was relatively evaluated when the plates were dipped into an aqueous solution of 1N potassium hydroxide for two hours, so that the adhesive layer was softened.

(4) Acid solubility: the solubility of the adhesive layer was relatively evaluated when the experimental plates were dipped into an aqueous solution of dilute sulfuric acid (10% by weight) for two hours.

(5) Insulating performance in water: the insulation between the two electrodes of the experimental plates was relatively evaluated when, with 50 gm/cm$^2$ loaded on them, the plates were dipped into water for two hours.

(6) Insulating performance in alkali: the insulation between the two electrodes of the experimental plates was relatively evaluated when, with 50 gm/cm$^2$ loaded on them, the plates were dipped into an aqueous solution of 0.1N potassium hydroxide for two hours.

(7) Acid conductivity: the electrical conductivity between the two electrodes of the experimental plates was relatively evaluated when, with 50 gm/cm$^2$ loaded on them, the experimental plates were dipped into an aqueous solution of dilute sulfuric acid (10% by weight) for two hours.

(C) Decision Standards for Experiment Evaluation

○: satisfactory

Δ: not so good, but within usable range x: unsatisfactory

TABLE 2

| | CONCRETE EMBODIMENT | | | | | | | COMPARISON EXAMPLE |
|---|---|---|---|---|---|---|---|---|
| | 8 | 9 | 10 | 11 | 12 | 13 | 14 | 3 |
| ADHESIVE STRENGTH | ○ | Δ | ○ | ○ | ○ | ○ | X | ○ |
| WATER RESISTANCE | ○ | Δ | Δ | Δ | ○ | ○ | X | ○ |
| ALKALI RESISTANCE | ○ | Δ | Δ | Δ | ○ | ○ | X | ○ |
| ACID SOLUBILITY | Δ~○ | Δ | ○ | ○ | ○ | Δ~○ | ○ | X |
| INSULATING PERFORMANCE IN WATER | ○ | ○ | Δ | ○ | ○ | ○ | ○ | ○ |
| INSULATING PERFORMANCE IN ALKALI | ○ | ○ | Δ | ○ | ○ | ○ | ○ | ○ |
| ACID CONDUCTIVITY | Δ~○ | Δ | ○ | ○ | ○ | Δ~○ | ○ | X |

POSSIBILITIES OF UTILIZATION IN INDUSTRY

As described above, the present invention may be applied to the detection of liquid leakage of battery fluid of a lead-acid battery or the like, such as one used in an uninterruptible power supply for electrical communication or the like. Furthermore, it is also capable of detecting liquid leakage of other types of acid liquid.

The invention claimed is:

1. An acid liquid leakage sensor comprising:
a first conductive member;
a second conductive member; and
an electrically insulating material electrically insulating said first conductive member from said second conductive member, wherein
said electrically insulating material includes a macromolecular compound having a basic functional group,
said electrically insulating material reacts with and is soluble in a liquid acid, and the electrical insulation between said first conductive member and said second conducting member provided by said electrically insulating material decreases upon at least partial dissolution of said electrically insulating material in the liquid acid, and
said macromolecular compound is a radically polymerized polymer containing repeating units derived from a monomer component having a basic functional group, and said monomer component includes at least 10% of all of the repeating units of said macromolecular compound.

2. The acid liquid leakage sensor of claim 1, wherein said macromolecular compound has a glass transition temperature, Tg, of at least 40° C.

3. The acid liquid leakage sensor of claim 1, wherein said electrically insulating material includes at least 10% of an extender.

4. The acid liquid leakage sensor of claim 3, wherein said extender includes a metallic carbonate.

5. An acid liquid leakage sensor comprising:
a first conductive member;
a second conductive member; and
an electrically insulating material electrically insulating said first conductive member from said second conductive member, wherein
said electrically insulating material includes a macromolecular compound having a basic functional group,
said electrically insulating material reacts with and is soluble in a liquid acid, and the electrical insulation between said first conductive member and said second conducting member provided by said electrically insulating material decreases upon at least partial dissolution of said electrically insulating material in the liquid acid,
said macromolecular compound is a radically polymerized polymer containing repeating units derived from a monomer component having a basic functional group,
said second conductive member is made from a substance having an ionization tendency different from the ionization tendency possessed by the substance from which said first conductive member is made, and
when the electrical insulation characteristic of said electrically insulating material decreases, an electromotive force, which is generated between said first conductive member and said second conductive member, is detected.

6. An acid liquid leakage sensor comprising:
a first conductive member;
a second conductive member; and
an electrically insulating material electrically insulating said first conductive member from said second conductive member, wherein
said electrically insulating material includes a macromolecular compound having a basic functional group,
said electrically insulating material reacts with and is soluble in a liquid acid, and the electrical insulation between said first conductive member and said second conducting member provided by said electrically insulating material decreases upon at least partial dissolution of said electrically insulating material in the liquid acid,
said macromolecular compound is a radically polymerized polymer containing repeating units derived from a monomer component having a basic functional group,
said first conductive member is a first comb shaped electrode which comprises a common electrode member and a plurality of fine electrode members which extend from the common electrode member; and
said second conductive member is a second comb shaped electrode which comprises a common electrode member and a plurality of fine electrode members which extend from the common electrode member and are disposed between said fine electrodes of said first comb shaped electrode.

7. The acid liquid leakage sensor of claim 6, wherein said first comb shaped electrode and said second comb shaped electrode are spaced apart by a gap which is at least 0.5 mm and no more than 8 mm.

8. The acid liquid leakage sensor of claim 1, wherein said first and second conductive members are a printing material in which a metallic material selected from zinc, copper, iron, aluminum, tin, nickel, and magnesium, or a powder of said metallic material, is mixed with a resin which becomes a binder.

9. The acid liquid leakage sensor of claim 1, further comprising notification means which operates by electrical conduction between said first conductive member and said second conductive member.

10. The acid leakage sensor of claim 5, further comprising notification means which operates by the electromotive force between said first conductive member and said second conductive member.

11. The acid leakage sensor of claim 1, wherein the basic functional group is selected from the group consisting of amino groups, methylol amino groups, dimethyl amino groups, and diethyl amino groups.

* * * * *